United States Patent [19]
Wilson

[11] 3,901,751
[45] Aug. 26, 1975

[54] METHOD OF MAKING RADIAL PLY TIRES
[75] Inventor: Melvin A. Wilson, Cuyahoga Falls, Ohio
[73] Assignee: The Goodyear Tire & Rubber Company, Akron, Ohio
[22] Filed: Apr. 6, 1973
[21] Appl. No.: 348,800

[52] U.S. Cl........ 156/133; 152/361 FP; 152/361 R; 156/123 R; 156/128 I; 156/394 R
[51] Int. Cl.².. B29H 5/01; B29H 5/26; B29H 17/28
[58] Field of Search.......... 156/110, 117, 123, 128, 156/128 I, 130, 131, 132, 133; 264/36, 315, 316, 321; 161/240

[56] References Cited
UNITED STATES PATENTS

| | | | |
|---|---|---|---|
| 1,289,767 | 12/1918 | Hopkinson | 156/123 |
| 1,374,505 | 4/1921 | Hopkinson | 156/123 |
| 1,488,343 | 3/1924 | Hoffman | 156/128 |
| 1,906,402 | 5/1933 | Newton | 156/394 X |
| 3,372,078 | 3/1968 | Fausti et al. | 161/240 |
| 3,525,654 | 8/1970 | Uotani et al. | 156/133 |
| 3,558,389 | 1/1971 | Bezbatchenko | 156/128 |
| 3,687,757 | 8/1972 | Menell | 156/126 |

FOREIGN PATENTS OR APPLICATIONS

| | | | |
|---|---|---|---|
| 708,856 | 5/1954 | United Kingdom | 156/128 |
| 1,017,776 | 4/1958 | Germany | 156/128 |

OTHER PUBLICATIONS

"The Vanderbilt Rubber Handbook," edited by George G. Winspear, published by R. T. Vanderbilt Co., N.Y., N.Y., 1958, referenced pp. 374–375.

*Primary Examiner*—Clifton B. Cosby
*Assistant Examiner*—John E. Kittle
*Attorney, Agent, or Firm*—F. W. Brunner; M. L. Gill

[57] ABSTRACT

A method of making a radial ply pneumatic tire in which the carcass plies are treated with electron radiation at least in the area of the plies destined to lie in the area of the shoulders of the tire. The tire is built according to a normal flat band or one-stage method of building tires, including the application of the belt structure and tread rubber to the cylindrical building form, except that the axial spacing between the bead cores on the building form is forshortened in order to avoid wrinkling of the carcass plies beneath the belt structure during the shaping operation.

7 Claims, 9 Drawing Figures

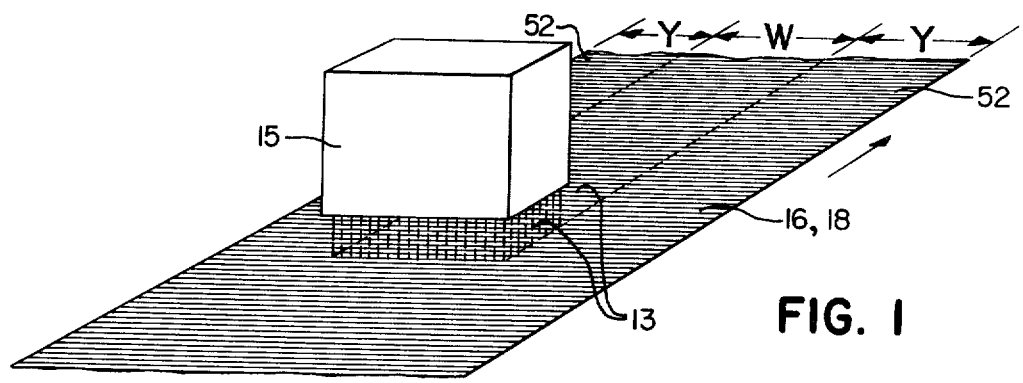
FIG. 1
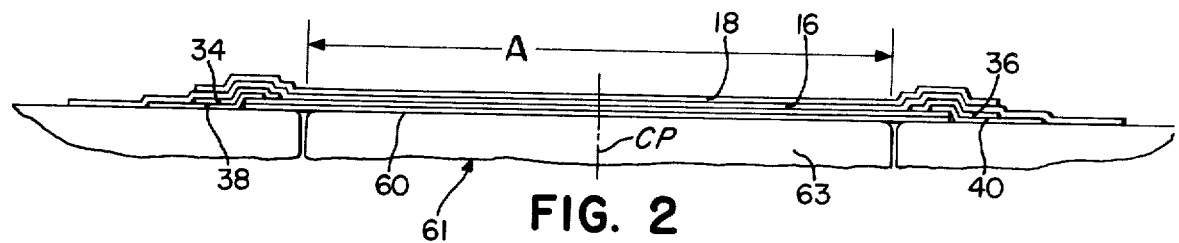
FIG. 2
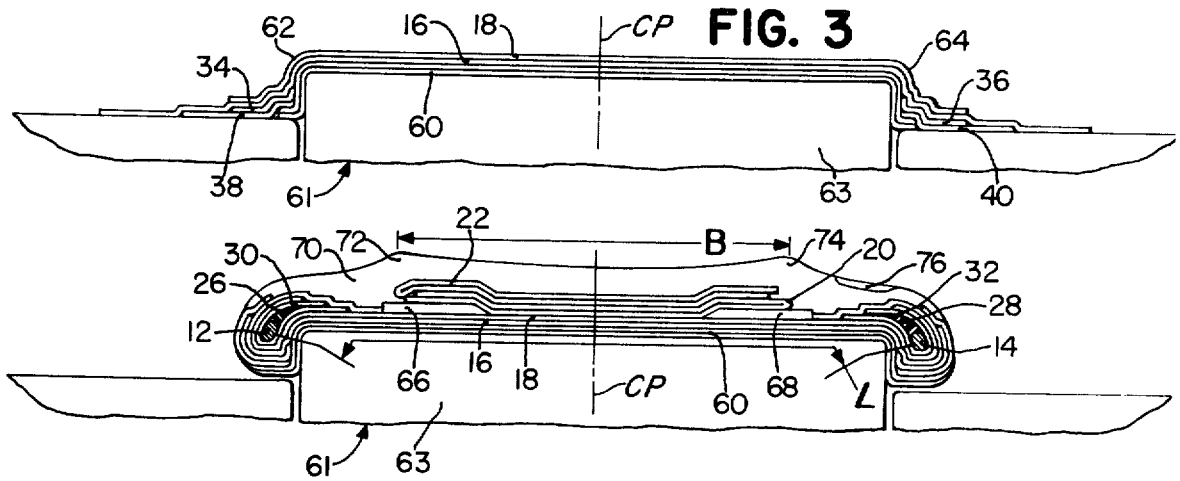
FIG. 3
FIG. 4

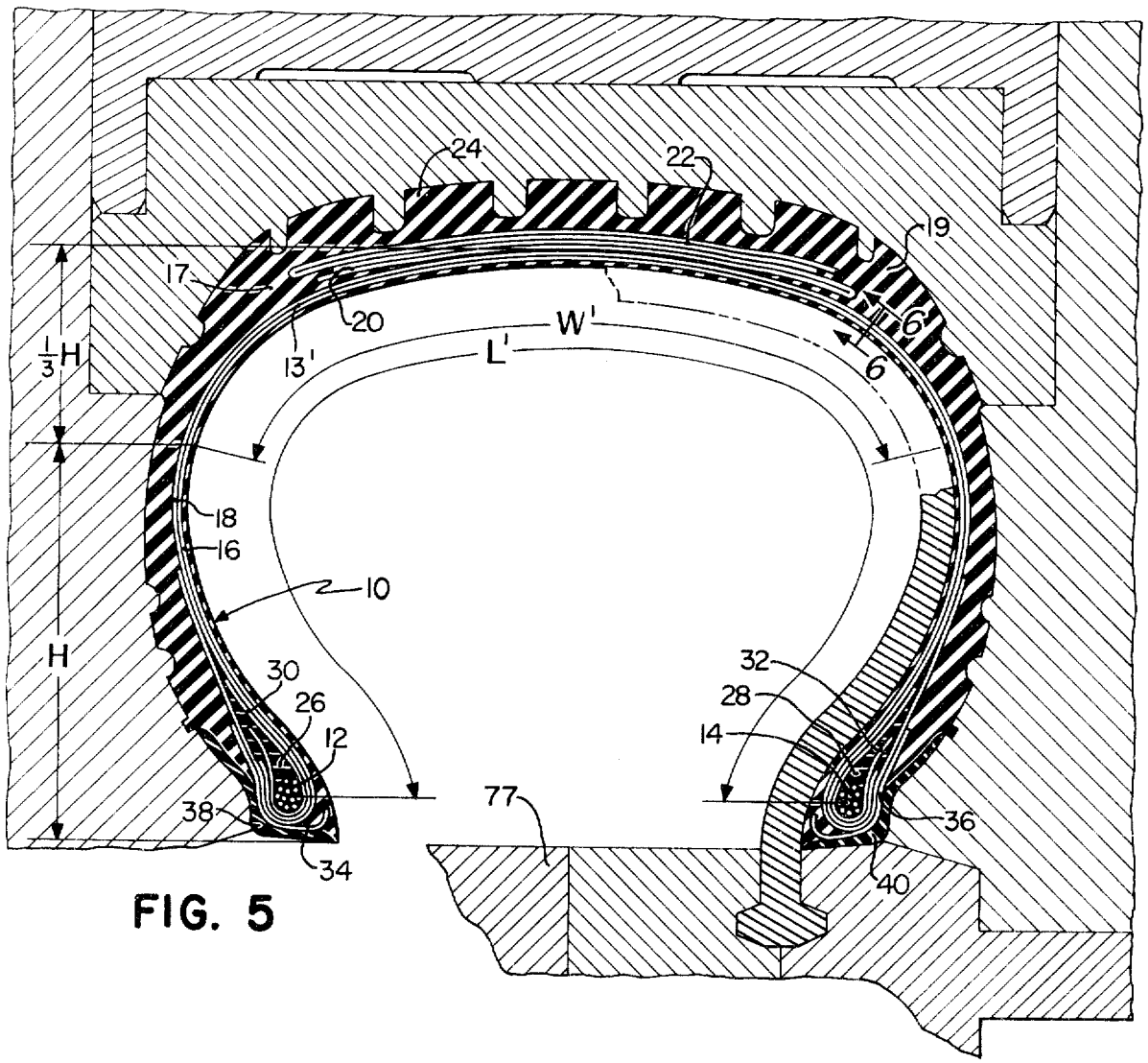
FIG. 5
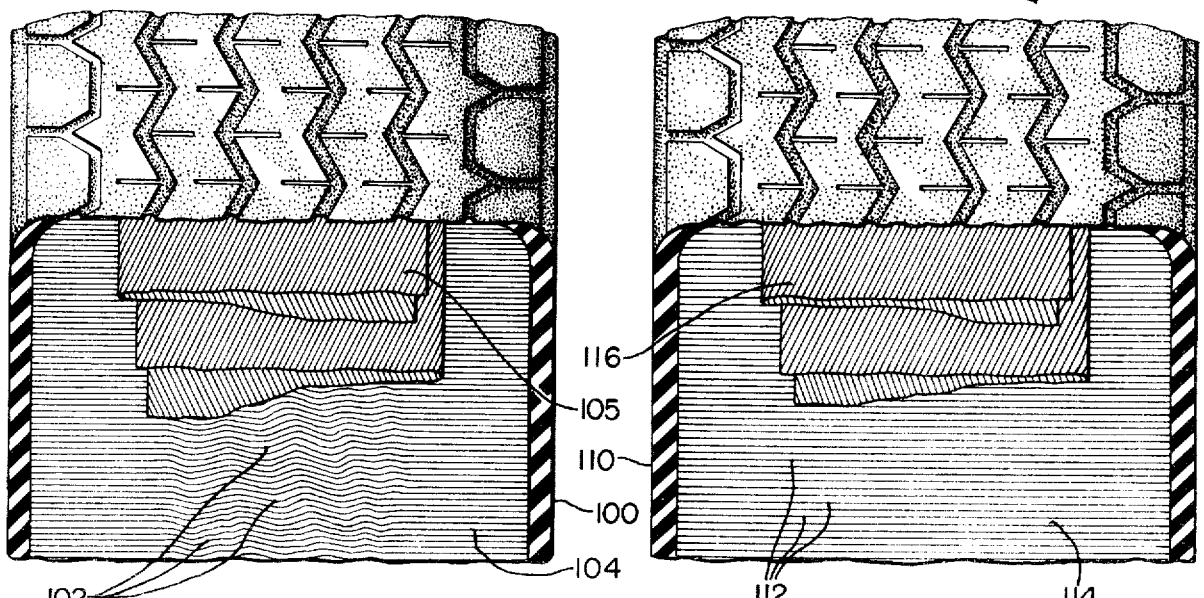
FIG. 7 PRIOR ART
FIG. 8

METHOD OF MAKING RADIAL PLY TIRES

This invention relates to pneumatic tires and more particularly to an improved method of making radial ply tires in a "one-stage" building operation.

The conventional method of building a radial ply tire includes an initial step of forming a cylindrical carcass, which carcass includes generally axially extending cords and a pair of annular inextensible bead cores. The carcass is then expanded to the general form of a torus having a diameter substantially equal to its final diameter and the belt plies are subsequently wrapped about the circumference thereof. In recent years considerable interest has developed in making a radial ply tire in a "one-stage" operation. This "one-stage" building method is characterized by applying the belt structure or belt plies to the carcass prior to expansion of the carcass to the form of a torus which has a diameter approximately equal to the final diameter of the carcass. This method of making radial ply tires has very significant advantages, particularly with regard to the cost of manufacturing.

During the shaping of the tire to the torus shape in the one-stage process, the belt structure expands circumferentially and contracts axially. The sheer forces acting between the belt structure and the carcass structure during the shaping operation causes axial contraction of the carcass plies beneath the tread. This contraction of the carcass plies is exhibited in either wavy cords in the radial ply carcass or high twist in the cords in the radial ply carcass or both wavy and high twist cords in the carcass plies.

The present invention provides a method of building radial ply tires in a one-stage operation and at the same time avoiding this irregularity in the carcass plies beneath the belt structure.

It is an object, therefore, of the present invention to provide a method of making radial ply tires in a one-stage building operation.

It is a further object of the present invention to provide a method of making a radial ply tire in a one-stage building operation and at the same time avoid irregularities in the carcass plies caused by axial compression of the carcass plies during the shaping operation.

Other objects will be in part apparent and in part pointed out more in detail hereinafter.

In the drawings:

FIG. 1 is a perspective view in diagramatic form of an apparatus used for treating the carcass plies in accordance with the present invention;

FIG. 2 is a cross-sectional view of a pneumatic tire illustrating the initial steps in the building operation;

FIG. 3 is a view similar to that of FIG. 2 but illustrating additional steps in the building operation;

FIG. 4 is a view similar to that of FIGS. 2 and 3 but illustrating the final steps in the building operation;

FIG. 5 is a cross-sectional view of the tire of FIG. 2 when shaped to the toroidal form and confined in a curing mold;

FIG. 7 is a sectional view of a portion of a prior art tire;

FIG. 8 is a sectional view of a tire treated in accordance with the present invention; and, FIG. 9 is a graph illustrating the penetration of electron radiation treatment used in accordance with this invention.

Figure 6:
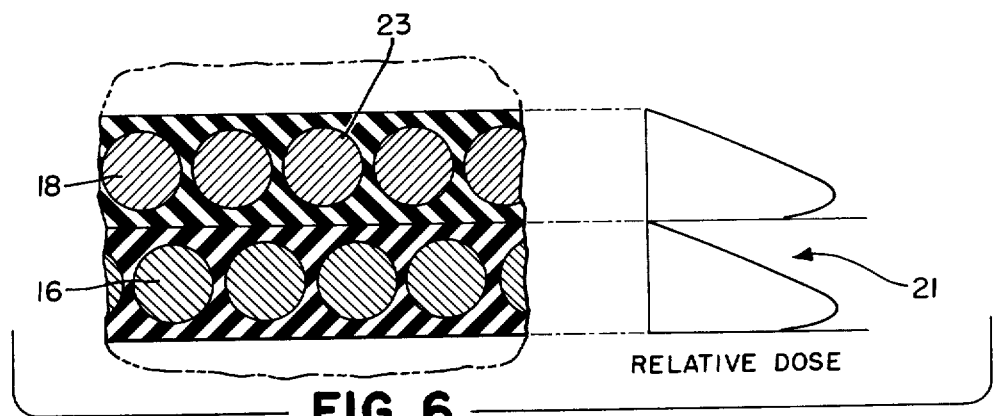
FIG. 6 is a cross-sectional view of the tire of FIG. 5 taken substantially along line 6—6 and illustrating the electron radiation treatment gradient and the uniformity of the carcass plies treated in accordance with this invention.

With reference to the drawings and in particular FIG. 5, there is illustrated a radial ply tire 10, the type with which the present invention is concerned. The tire includes a pair of annular inextensible bead cores 12 and 14 and a pair of radial carcass plies 16 and 18 extending circumferentially about the tire and from the bead 12 to the bead 14. For purposes of this invention, a radial ply tire is a tire in which the carcass plies extending from bead to bead have a cord angle of between 75 and 90 degrees with respect to the mid-circumferential centerline of the tread. A pair of folded fabric belt plies 20 and 22 extend circumferentially about carcass plies 16 and 18 and are located radially inwardly of the circumferentially extending tread or non-skid portion 24. The belt plies 20 and 22 terminate in axial directions in the shoulder portions 17 and 19 at the lateral edges of the tread 24.

Also in the particular embodiment illustrated there is a hard rubber apex strip 26, 28 extending radially outwardly of and from each bead core 12, 14. A flipper strip 30, 32 of square-woven fabric is wrapped about each bead core and generally encases the respective apex strip 26, 28. A square-woven fabric chafer strip 34, 36 is wrapped about the respective bead core 12, 14 and covers the radially inner portion of the carcass plies 16, 18. A hard rubber chafer strip 38, 40 covers a portion of the respective chafer strips 34, 36 and extend radially outwardly beyond the radially outer extent of the respective chafer strips 34, 36.

With reference to FIG. 1, and in accordance with the present invention, at least one of the carcass plies 16, 18 is treated with an electron radiation process at least over the area 13 which is to be adjacent the tread portion 12 and the shoulder portions of the tire. The width W' of the treated area 13 should extend over the radially outer one-third of the section height of the carcass plies when in the as-cured configuration. As illustrated in FIG. 5, therefore, the treated area 13' over the width W' should extend over the radially outer one-third of the section height H of the tire 10.

While it is preferred that and most convenient that this area 13 (13') be treated with electron radiation, it is to be understood that more or less of the carcass plies could be so treated. However, it is important that the areas of the carcass adjacent the lateral edges of the belt structure or shoulder portions 17 and 19 of the tire be so treated.

Figure 9:
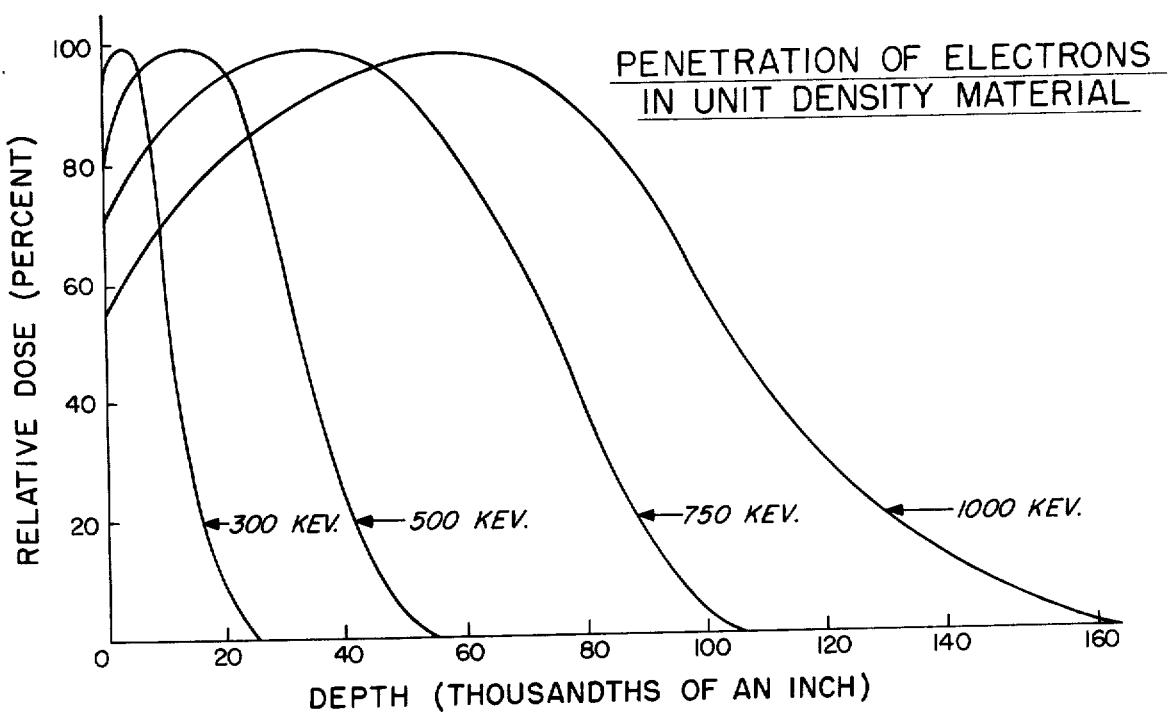

The dosage or treatment of the component with electron radiation must be carefully controlled within limits which are chosen taking into consideration the dimensions of the component to be treated. The dosage distribution of the radiation treatment within a specific component is illustrated in FIG. 9 and is dependent upon the voltage of the electron source. It is convenient and normally preferable that the radiation treatment be applied to one side of the component. Also, it is desirable that the dosage be contained entirely within the component as opposed to some energy passing completely through the component.

Thus from a consideration of the graph in FIG. 9 it can be seen that for thin components relatively low voltage electrons are used in order that all of their energy is deposited within the component. A relatively low voltage may also be chosen in order that no dose is received by the under side of the component; that is, the side opposite the electron source. The under side is, therefore, left completely uncured.

For a typical layer of fabric reinforcing component with a thickness of 60 thousandths of an inch, a voltage of 500 kilovolts would be chosen. This voltage results in the under side or side of the component opposite the electron source receiving no electron radiation treatment and the side facing the electron source receiving only 80 percent of the maximum dosage that is deposited in the interior region of the component.

For thicker components high voltage electrons would preferably be chosen in order to provide a low relative dose on the side of the component facing the electron source as well as the side opposite the electron source. Thus, if the component were 160 thousandths of an inch thick, an electron voltage 1,000 kilovolts would be chosen. The side facing the source would receive only approximately 55 percent of the maximum dosage deposited within the component. It can therefore be seen that there is a large degree of radiation treatment in the interior portion of the component yet both exterior surfaces receive relatively less treatment or none at all.

The total dosage applied to a unit width component (neglecting air and accelerator window losses) is directly proportional to the product of the output voltage and the current of the accelerator and is inversely proportional to the speed at which the material or component traverses the radiation treating unit. If the electron source is adjusted to treat a wider portion W of a component passing through the unit with no change in voltage, current or speed of the component the dosage received by the component would be reduced by an amount which is directly proportional to the increase in width of the treated area. The dose can be determined empirically by use of any one of the various dosimeters available which lends itself conveniently to the particular operation.

The dose which applied to any component is determined by the tire engineer and will be dependent upon the strength or structural integrity desired in the uncured state. If more strength is desired, a higher dose will be applied and conversely a lower dose if lower strength is desired. Doses of between 1 and 5 megarads may be used with doses of 2 to 4 megarads being the preferred range for most applications.

It is preferred that the side of the ply which is destined to be disposed radially inwardly of the tire be the side facing the electron source 15 and that both plies 16 and 18 be so treated. This will result in the relative electron treatment gradient in the plies 16 and 18 illustrated at 21 in FIG. 6 and the uniform cord distribution illustrated at 23.

The so treated carcass ply or plies are then incorporated in a radial ply tire according to a one-stage building operation as described above with the exception that the carcass plies, at least in the area between the bead cores 12 and 14, are shorter in axial dimension than is normal in heretofore one-stage building operations. The amount of decrease in axial spacing between the bead cores surrounding the carcass plies 16 and 18 when on the cylindrical tire building drum depends upon the materials of construction and the size of the tire involved and will have to be determined in each individual case. In any event, the forshortening of the distance between the bead cores must be an amount sufficient to provide enough tension in the carcass ply cords during the shaping operation to avoid the wavy configuration beneath the belt structure. This decrease in length of the carcass plies between the bead cores in the cylindrical form will normally be in the range of .7 to 1.2 inch with respect to thermoplastic fibers such as nylon and polyester when manufacturing passenger car tires. When high modulus fibers such as rayon are used in passenger car tires, the decrease in length will be somewhat less and in the order of .5 to .8 inch.

With reference to FIGS. 4 and 5, the contour length L of the carcass plies 16 and 18 between corresponding points adjacent the bead cores 12 and 14 is preferably 1 to 7 percent less than the contour length L' of the carcass plies 16 and 18 between the same corresponding points adjacent the bead cores 12 and 14 when the tire is in the mold.

In a specific example of making a size HR 70-15 tire in accordance with the present invention, two plies of polyester tire cord fabric are coated with a vulcanizable elastomeric material in the normal manner. The cords are of 1300/2 polyester and the gauge or thickness of each coated carcass ply 16 and 18 is .058 inches. The first ply 16 in the uncured state is 27.2 inches wide and the second ply 18 is 21.8 inches wide.

With reference to FIG. 1, each ply is passed by an electron radiation source specifically adjusted to treat the central portion 13. The width W of the central portion in the specific embodiment illustrated is 12 inches, thus leaving untreated portions 52 on each side. The width Y of the untreated side portions 52 on the first ply 16 is 7.6 inches and the width Y of the side portions 52 on the second ply 18 is 4.9 inches. The rest of the components described above with respect to the tire 10 are prepared in a normal manner prior to assembly on the tire building drum.

With reference to FIG. 2, in building a tire in accordance with the present invention, an inner liner 60 of air impervious elastomeric material which is 18.6 inches wide is wrapped circumferentially about a tire building drum 61 twice to form a double layer as shown. The axially outer ends of the inner liner 60 extend axially beyond the end of the expandable central portion 63 of the drum 61. The axial length A of this expandable central portion 63 of the drum 61 is 15.5 inches. This axial dimension is 1 inch less than the normal axial length of the expandable central portion of the drum utilized heretofore for making a size HR 70-15 radial ply tire having a two-ply polyester carcass and two folded rayon belt plies. It will be appreciated that this reduction in axial length of the drum will result in a closer spacing of the bead portions and ultimately in higher tension in the cords of the carcass ply during the shaping operation.

The pair of 38, 40 of rubber chafer strips 2 inches wide are wrapped circumferentially about the axially outer portions of the drum 61 and overlap the respective axially outer end of the inner liner 60 by about .2 of an inch. A pair 34, 36 of square-woven fabric chafer strips 2.3 inches wide are then wrapped circumferentially about the axially inner ends of the respective rubber chafer 38, 40 and overlap the respective chafer about .6 to .8 inches. It should be noted that these chafer strips are located symmetrically about the centerplane CP of the tire building drum. The two fabric carcass plies 16 and 18 which have been previously treated with electron radiation are then wrapped circumferentially about the liner 60 and the chafer strips 34, 36, 38, and 40.

With reference to FIG. 3, the central portion 63 of the tire building drum 61 is expanded 2.8 inches in diameter to form a cylindrical central portion with shoulders 62 and 64 at its axially outer ends for receiving the bead cores 12 and 14.

A pair of elastomeric shoulder wedges 66 and 68 are wrapped circumferentially about the carcass plies 16 and 18 and spaced apart an axial distance of 5.8 inches and are again located symmetrically about the centerplane CP.

A pair of folded belt plies 20 and 22 of rayon tire cord fabric are wrapped circumferentially about the carcass plies 16 and 18 and overlap or encase the axially inner edges of the shoulder wedges 66 and 68. The folded belt plies are each originally 20.2 inches wide and folded over to form a composite structure 10.2 inches wide allowing a .2 inch step-off at the edge of the respective ply. The folded plies are then wrapped circumferentially about the drum with a .2 inch step-off between the two folded plies with the composite of the belt plies 20 and 22 being located symmetrically with respect to the centerplane CP.

With reference to FIG. 4 the bead cores 12 and 14 including the rubber apex strip 26 and 28 and fabric flippers 30 and 32 are positioned adjacent the respective shoulder 62 or 64 of the expanded central portion 63 of the drum. The axially outer ends of the carcass plies 16 and 18 as well as the axially outer ends of the chafer strips 34, 36, 38, and 40 are then turned about the respective bead portions.

A piece of extruded tread and sidewall rubber 70 of a predetermined cross-sectional contour is wrapped circumferentially about the carcass plies 16 and 18. The thickest portions 72 and 74 or nodes of the rubber 70 are spaced apart axially a distance B equal to 10.5 inches. It should be noted that the width of the composite belt structure is 10.4 inches and thus slightly narrower than the spacing between the nodes. It is preferred that the node spacing be equal to or slightly greater than the width of the composite belt structure when the tire is in the cylindrical configuration. A white sidewall strip 76 including a black cover strip is then wrapped circumferentially about the tire at one side thereof.

With reference to FIG. 5, the tire 10 is then expanded to a toroidal form, confined in the mold 77, and vulcanized under heat and pressure. During the shaping operation there is considerable movement and shifting of the components. For example, the width of the belt structure decreases from 10.4 inches in the cylindrically shaped tire to 5.8 inches in the toroidally shaped cured tire. Also, while the heavy or thick portion of the tread rubber had a width of at least 10.5 inches, the width of the non-skid or thick portion of the tread in the cured tire is approximately 5.8 inches. Further, during the shaping of the tire considerable tension is applied to the radial carcass cords, thus causing them to turn slightly about the beads in an axially inward direction with respect to the rotational axis of the tire. The shape of the rubber extruded components, the width and specific locations were thus specifically provided in order to accommodate such movements and shifting of components.

With reference to FIG. 7, there is illustrated a tire 100 which was constructed in accordance with normal one-stage radial building operation. It will be observed that the cords 102 and the carcass ply 104 are wavy or sinuous in the area beneath the belt structure 105. However, with reference to FIG. 8, a tire 110 constructed in accordance with this invention will have straight cords 112 in the carcass 114 in the area of the tire beneath the belt structure 116. This is accomplished by providing the electron radiation treatment described above and then applying sufficient additional tension to the cords in the carcass plies during the shaping operation. It should be observed that both increased tension in the carcass cords and electron radiation treatment of the carcass plies are necessary in order to accomplish this result.

In the particular embodiment illustrated the carcass plies were treated with electron radiation from the side which was destined to be the radially inner side of the ply and had a cure profile as indicated at 21 in FIG. 6. While this is the preferred treatment, it will be appreciated that they could be treated from the top or bottom or any combination thereof. Further, it may be also desirable to treat one ply only from both sides with electron radiation.

While certain representative embodiments and details have been shown for the purpose of illustrating the invention, it will be apparent to those skilled in this art that various changes and modifications may be made therein without departing from the spirit or scope of the invention.

What is claimed is:

1. A method of manufacturing a radial ply pneumatic tire comprising: preparing a carcass ply of cord reinforced elastomeric material; treating the portions of said carcass ply which are destined to be disposed beneath and between the shoulder portions of the tire with a dosage of electron radiation equal to between 1 and 5 megarads emitted from an electron accelerator at a voltage intensity such that substantially no energy passes through said carcass ply to increase the structural strength of the elastomeric material; wrapping the carcass ply circumferentially about a cylindrical tire building form; positioning two inextensible bead cores about said carcass ply with a predetermined axial spacing between said bead cores; turning each axially outer end of said carcass about an inextensible annular bead core; while the ply is in a substantially cylindrical configuration, wrapping at least one biased angled cord reinforced belt ply about the carcass ply; providing elastomeric tread rubber on said carcass, and after the belt ply has been applied to the carcass ply, shaping the tire to the form of a torus and heat curing the tire in a mold, said predetermined axial spacing being sufficiently small such that upon shaping of the tire to the form of a torus the cords in the carcass plies are subjected to tensions which effectively resist compression of the carcass ply cords beneath the belt structure caused by the pantographing of the belt cords during the shaping operation, thus preventing wrinkling of the carcass plies under the belt structure.

2. A method as claimed in claim 1 wherein said carcass ply is treated with electron radiation on the side thereof which is destined to be disposed radially inwardly with respect to the tire.

3. A method as claimed in claim 2 wherein more than one carcass ply is included in said tire and each carcass ply is treated with between 1 and 5 megarads on the side thereof which is destined to be the radially inward side thereof with respect to the tire.

4. A method as claimed in claim 3 wherein the portion of said carcass ply which is destined to form the radially outer one-third of the carcass structure is subjected to said electron radiation treatment.

5. A method as claimed in claim 1 wherein the contour length of said carcass ply between corresponding points adjacent the bead cores when said carcass ply is in a generally cylindrical configuration is between 1 and 7 percent less than the contour length of said carcass ply between said points when the tire is in said mold.

6. A method as claimed in claim 2 wherein the contour length of said carcass ply between corresponding points adjacent the bead cores when said carcass ply is in a generally cylindrical configuration is between 1 and 7 percent less than the contour length of said carcass ply between said points when the tire is in said mold.

7. A method as claimed in claim 3 wherein the contour length of each carcass ply between corresponding points adjacent the bead cores when said each carcass ply is in a generally cylindrical configuration is between 1 and 7 percent less than the contour length of said each carcass ply between said points when the tire is in said mold.

* * * * *